July 5, 1966     G. R. ANDERSON ETAL     3,259,159
FRUIT TRIMMING MECHANISM
Filed Jan. 13, 1964     2 Sheets-Sheet 1
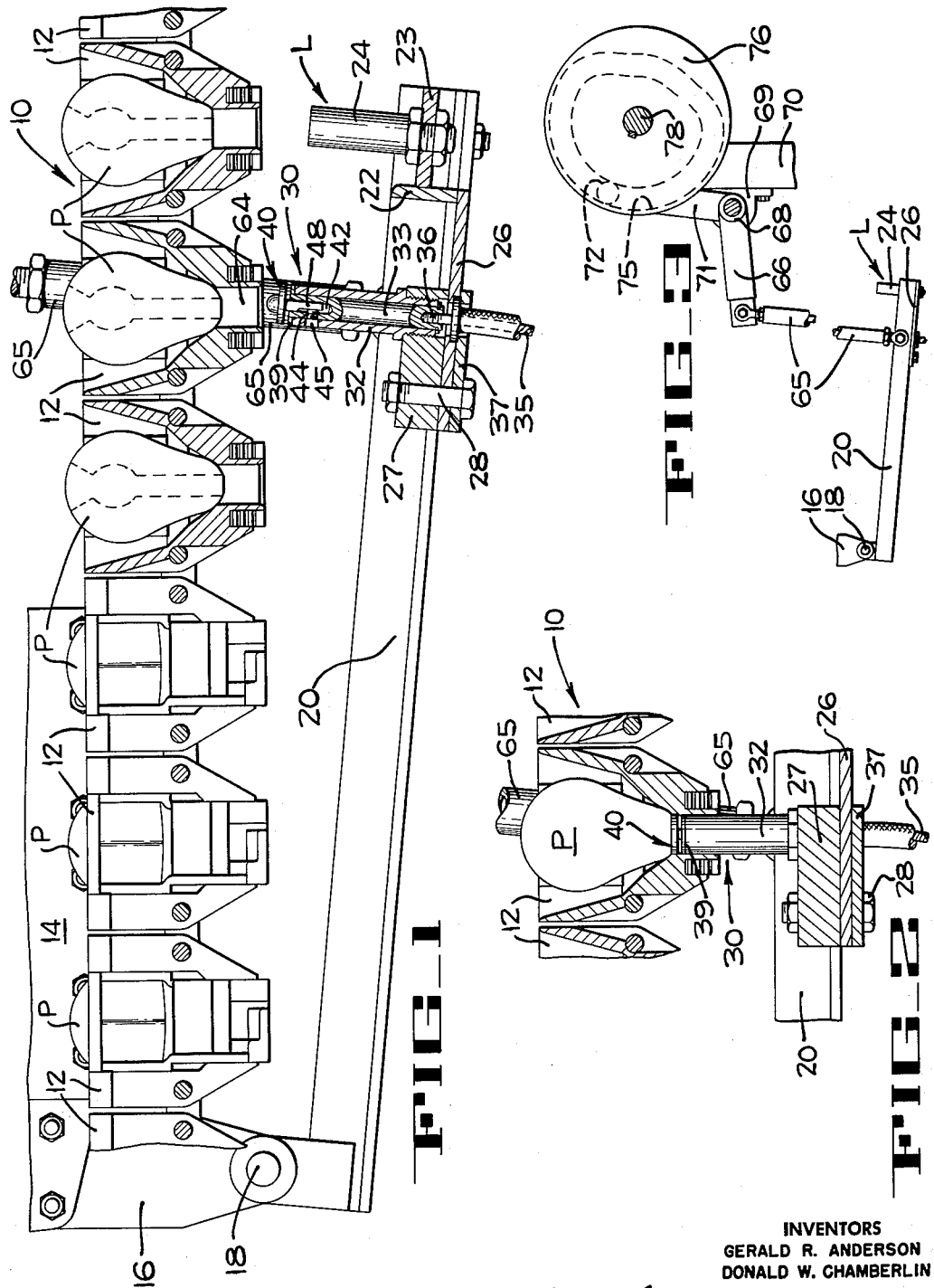
INVENTORS
GERALD R. ANDERSON
DONALD W. CHAMBERLIN
BY *Hans G. Hoffmeister*
ATTORNEY July 5, 1966  G. R. ANDERSON ETAL  3,259,159
FRUIT TRIMMING MECHANISM
Filed Jan. 13, 1964  2 Sheets-Sheet 2
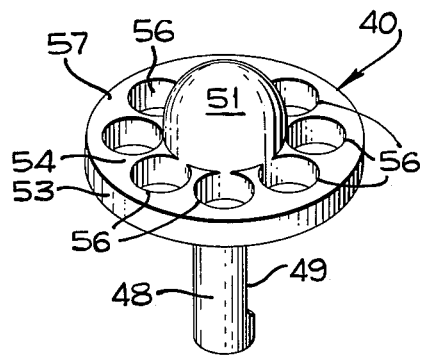
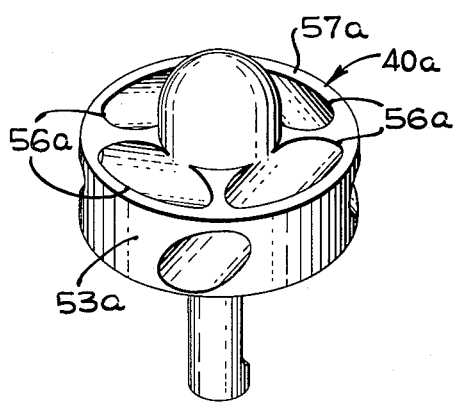
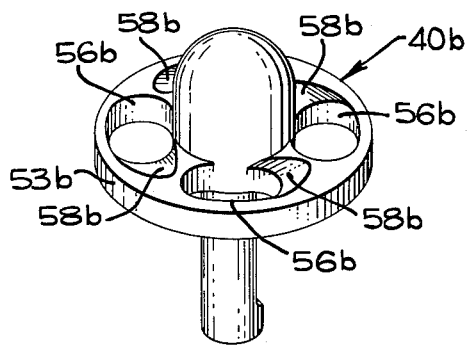
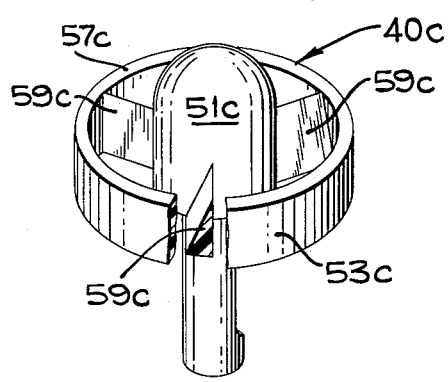
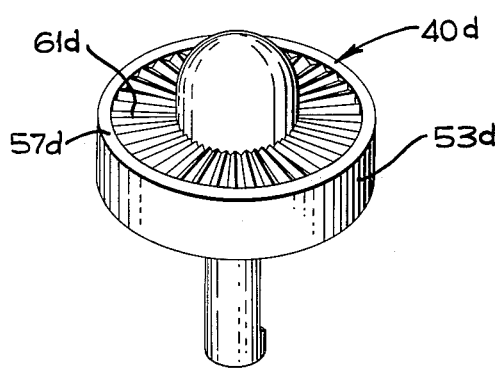
INVENTORS
GERALD R. ANDERSON
DONALD W. CHAMBERLIN
BY
ATTORNEY United States Patent Office 3,259,159
Patented July 5, 1966

3,259,159
FRUIT TRIMMING MECHANISM
Gerald R. Anderson, Campbell, and Donald W. Chamberlin, Los Gatos, Calif., assignors to FMC Corporation, San Jose, Calif., a corporation of Delaware
Filed Jan. 13, 1964, Ser. No. 337,284
12 Claims. (Cl. 146—81)

The present invention pertains to fruit trimming mechanisms and more particularly to a mechanism for trimming into planar form one of the ends of elongated fruit such as pears.

Under present industrial conditions, fruit such as pears or the like are customarily subjected to a series of sequentially arranged steps during their initial processing before canning and sale to the ultimate consumer. Such steps may include, by way of example, the steps of washing, peeling, coring or pitting, and slicing. In addition to these standard operations, it has been found preferable from the standpoint of attractiveness to the consumer to trim the end or ends of the fruit to present a clean, flat end surface rather than the rounded or pointed end surface which is ordinarily left after the peeling and coring operations and which might become crushed or otherwise damaged during handling so as to present a distinctly unattractive appearance.

It is therefore one of the objects of the present invention to provide a trimming mechanism which is operable to trim into planar form the elongated ends of fruit such as pears.

Another object of the present invention is to provide a fruit trimming mechanism for use in conjunction with present day industrial machinery, with such mechanism being useable without requiring any extensive modifications of the existing machinery.

Other objects and advantages of the present invention will become apparent from the following description and the accompanying drawings in which:

FIGURE 1 is a fragmentary side elevation of the trimming mechanism of the present invention as applied to fruit processing machinery presently used in the industry, with parts thereof being broken away for the purpose of clarity.

FIGURE 2 is an elevation similar to a part of FIG. 1 but showing a portion of the apparatus in a position which the trimming mechanism occupies during the actual trimming or cutting of the fruit.

FIGURE 3 is a diagrammatic elevational view, on a reduced scale, illustrating the apparatus for actuating the trimming mechanism of FIGURES 1 and 2.

FIGURE 4 is an enlarged perspective showing the cutting element of the trimming mechanism illustrated in FIGURES 1 and 2.

FIGURES 5–8 are enlarged perspectives similar to FIGURE 4 and showing various modified forms of cutting elements which may be used with the trimming mechanism of FIGURES 1 and 2.

While the mechanism of the present invention may be used in conjunction with a variety of modern fruit processing equipment or by itself as an individual piece of processing equipment, it is particularly adapted for use with the apparatus shown and described in the pending United States patent application, Ser. No. 221,174 to Gerald R. Anderson et al., which is assigned to the assignee of the present invention. Furthermore, while the trimming mechanism of the present invention may be used with different types of fruit, it is particularly useful for trimming the elongated stem ends of pears to eliminate the fragile pointed ends which have been, in the past, easily bruised or crushed to leave an unattractive "mushy" appearance. The trimming mechanism will, therefore, be described with relation to its use in a pear processing system as set forth in the aforementioned patent application. The trimming operation is adapted to be carried out upon whole pears which have previously been peeled and cored and which are arranged in an oriented position with their hollow, cored axes in an approximately vertical position.

As seen in FIGURE 1, a conveyor 10 comprised of a plurality of serially arranged fruit supporting cups 12 is positioned with respect to a movable frame structure 14 so that the two may be moved conjointly during certain time intervals in which coring and slicing operations are performed upon the fruit by suitable mechanisms (not shown) mounted upon the frame structure. A part of this existing fruit processing machinery consists of a fruit lifting device L which is provided to aid in the splitting operation by unseating or lifting the pears P from the fruit supporting cups 12. In order to mount the fruit lifting device, pivot brackets 16 are secured to the frame 14 at both sides of the conveyor (one bracket only being shown in FIG. 1). The brackets are connected by a pivot rod 18 which is journalled therein and which has affixed thereto a pair of pivot arms 20 extending parallel to the conveyor on either side thereof. The pivot arms are joined at their distal ends by an angle iron 22 and a holding bar 23 which mounts an upstanding tubular member 24 directly beneath the conveyor 10 for movement into and out of one of the fruit holding cups 12 during the splitting of the fruit. This apparatus and its operation are fully described in the aforementioned pending patent application and form no part of the present invention.

A flat mounting plate 26 is bolted to the angle iron 22 and extends rearwardly beneath the conveyor 10. At the trailing end of plate 26 there is firmly attached a mounting block 27 by means of bolts 28. A trimming mechanism 30 is situated upon the mounting block directly behind the tubular member 24 and, during operation of the apparatus, the trimming mechanism enters a fruit receiving cup which is immediately behind the cup entered by the tubular member. It will be understood that the cups 12 of conveyor 10 are disposed in transverse rows and longitudinal lanes and, accordingly, there is one lifter tube 24 for each lane and one trimming mechanism for each lane, such plural structure being further illustrated and described in the aforementioned pending patent application. Only one of such lanes has been shown in FIG. 1.

The trimming mechanism 30 includes a cylindrical sleeve 32 which is threaded into the mounting block 27 directly beneath one of the cups of the conveyor 10. A shaft 33 is rotatably received within the sleeve. This shaft is continuously driven during operation of the mechanism by means of a flexible cable 35 which is threaded into the shaft at 36 and is, in turn, driven by an electric motor or similar device (not shown). The sheath of the cable is secured to mounting plate 26 by a clamp plate 37 that engages a flange on the sheath, the clamp plate being held in place by the bolts 28. The shaft 33 has a flange 39 at one end that abuts one end of sleeve 32, and a spring clip is disposed in a groove at the other end of the shaft to hold the shaft in the sleeve.

The actual trimming of the fruit is accomplished by a cutting element 40 which has a central stem 48 axially received within a cylindrical passage 42 at the upper end of the shaft 33. The cutting element is fixed within this passage by means of a set screw 44 inserted through a radial passage 45 in the supporting sleeve 32. It can be seen therefore that, as the shaft 33 is rotated by means of the flexible cable 35, the cutting element 40 will be rotated also. When the cutting element is placed adjacent the end of a pear P, it will operate in the manner of a grinding element to trim the pear rapidly into the planar shape of its cutting surface.

The cutting element 40 is shown in detail in FIG. 4.

The upper or working portion of the cutting element comprises a large, semi-spherical hub 51 which acts as a guide and is adapted to be received within the hollow cored-out portion (indicated by dashed lines in FIG. 1) of the pear to be trimmed, and an annular flange 53 which surrounds the hub and which has an upper surface 54 adapted to perform the actual cutting or trimming operation. In order to provide for this latter function, the surface 54 includes a series of openings defined by a plurality of annularly spaced holes 56 drilled through the flange 53 parallel to the axis of the stem 48. The circular edges of these holes provide cutting edges to trim the pear material. It can be seen that the fruit pulp material which is cut off during the trimming will be removed through the holes 56 and thus ejected from the apparatus. An especially important feature of the cutting element is the outer edge 57 of the cutting surface 54 which is continuous and imperforate. This non-cutting surface characteristic permits the edge to act as a gauge to prevent the cutting element from moving too far into the pear being trimmed and, therefore, determines the maximum diameter of the trimmed end. If desired, the edge 57 may be broken away in one or more places so long as it remains continuous over a major portion of the periphery of the cutting surface whereby it will function as a gauge in the manner described.

FIGURE 5 shows a modified form 40a of the cutting element. Cutting element 40a is similar to cutting element 40 except for the annular flange 53a which is thicker in a direction parallel to the cutter axis than the corresponding flange 53 of element 40. The cutting edges on the flange 53a are provided by four holes 56a which are drilled at an angle of approximately 60° to a radial plane passing through the axis of the cutting element 40a. Each of these holes lies in planes paralleling the axis of the cutting element. Again, it is to be noted that the annular edge 57a of the flange 53a is imperforate and acts as a gauge in the same manner as does the edge 57.

FIGURE 6 shows a further modification 40b of the cutting element. This form is similar to the previously described embodiments except that the cutting edges here are formed by four drilled holes 56b which extend directly through the flange 53b an include, at their upper edges, a downwardly sloping surface 58b which slopes downwardly and rearwardly relative to the direction of rotation of the flange.

A further embodiment 40c of the cutting element is shown in FIGURE 7. In this form the modified annular flange 53c comprises an outer ring 57c which acts as a gauge to determine the maximum width of the trimmed portion as in the previous embodiments, and a plurality of fins 59c connecting the ring with a central hub 51c and serving as cutting elements to remove the unwanted fruit pulp material.

A still further embodiment 40d of the cutting element is shown in FIGURE 8 wherein the flange 53d is provided with an upper surface 61d of serrated configuration. Again, it is to be noted that the outermost edge portion 57d of the flange 53d is smooth and imperforate and acts as a stop bar in the manner described above.

During operation of the apparatus of the present invention, each trimming mechanism 30 is sequentially moved into each fruit holding cup 12 of a line of cups through a passage 64 in the bottom portion thereof. The cutting element 40 is continuously rotated and, as it is received against the lower projecting end of the pear received within the cup, the fruit pulp is ground or trimmed off by the sharp edges formed at the upper surface 54 of the annular flange 53. The hub 51 is received within the hollow core portion at the longitudinal axis of the pear and acts as a guide to bring the cutting edges into the proper position. The cutting element 40 will continue to cut the end of the pear into a planar shape until the outer imperforate edge 57 abuts against the fruit. From this point on, further rotation and lifting movement of the trimming mechanism 30 only succeeds in lifting the fruit within the cup.

The apparatus for lifting the trimming mechanism 30 into and out of the fruit holding cups 12 is the same as that used to operate the fruit lifting device L and is fully described in the aforementioned pending Anderson et al. patent application Ser. No. 221,174. This apparatus is shown schematically in FIGURE 3. It can therein be seen that each of the outer lifting arms 20 which mount the trimming apparatus 30 is pivotally attached to a lifter arm 65 which is, in turn, pivoted to a rigid link 66. The two links 66 are fixed to a tubular rockshaft 68 which is mounted in bearings 69 attached to a portion 70 of the fixed frame structure of the machine. Rockshaft 68 also rigidly mounts a cam follower arm 71 including a cam follower 72 which is adapted to ride in a track 75 formed in the face of the cam 76. As the cam 76 is rotated by means of a second shaft 78, the cam follower arm 71 will be rotated and, consequently, the trimming mechanism 30 will be lifted within one of the fruit holding cups 12 to perform the trimming operation. Further details of the mechanism for actuating the arms 20 are contained in the above-mentioned Anderson et al. application and reference may be had to said application for details of structure and operation not found herein.

It can be seen that the present invention provides a member for rapidly and efficiently trimming the projecting, elongated ends of pears or similar fruit to leave a flat and neat end so as to prevent the possible "mushy" or "stringy" ends which might occur during further processing and canning of the fruit. The apparatus may be easily installed and adapted to presently existing machinery. While preferred embodiments of the invention have been described herein it should be understood that various changes may be made in the construction without departing from the spirit of the invention as defined in the appended claims.

The invention having thus been described, what is claimed and desired to be protected by Letters Patent is:

1. A fruit trimming mechanism comprising a rotatable cutting member adapted to be continuously rotated while in abutment with one of the ends of the fruit to trim said end into a planar form, said member including a plurality of cutting edges defining a flat cutting plane, said cutting edges being surrounded by an imperforate integral band providing an annular surface portion coplanar with said cutting edges which acts as a gauge allowing said cutting edges to trim the fruit until said annular surface portion comes in contact with the fruit and to thereby determine the maximum diameter of the trimmed end of the fruit.

2. A fruit trimming mechanism comprising a rotatable member adapted to be continuously rotated while in abutment with one of the ends of the fruit to trim said end into a planar form, said member having a projecting axial portion movable into a hollow axial core portion of the fruit and a plurality of cutting edges located in a plane surrounding the projecting axial portion, an imperforate integral band providing an annular surface portion coplanar with said cutting edges acting as a gauge to prevent the cutting edges from moving into the fruit when said annular surface comes in contact with the fruit and as a result sets the maximum diameter of the trimmed planar end of the fruit.

3. In a fruit processing system including a conveyor for the fruit comprised of a plurality of serially arranged, open-bottomed, fruit holding cups, the improvement comprising a trimming mechanism for trimming one end of the fruit into a flattened form, said mechanism including a member movable into and out of said fruit holding cups through their open bottom portions, said member having a plurality of circumferentially spaced cutting edges coplanar with and located radially inwardly from an annular smooth surface, means for continuously rotating said member, and means for moving said member relatively to said cups to bring it into engagement with the lowermost end of said fruit.

4. In a fruit processing system including a conveyor for the fruit comprised of a plurality of serially arranged, open-bottomed, fruit holding cups, the improvement comprising a trimming member adapted to be moved into and out of said cups through their open bottom portions to trim the lowermost end of the fruit into a planar form, said member comprising a rotatable cutting element having a cutting edge at its upper end and an imperforate portion radially bounding and coplanar said cutting edge to determine the maximum diameter of the trimmed end on the fruit.

5. In a fruit processing system which includes a plurality of fruit holding cups having open bottom and top portions for the conveyance of fruit through various processing operations, the improvement comprising a mechanism for trimming the lowermost ends of said fruit into a flat shape by moving into and out of said open bottom portions of the cups, said mechanism including a support member, a cutter rotatable within said support member, said cutter having an upper planar surface with a plurality of openings therein forming a plurality of cutting edges, said surface being bounded by an annular imperforate surface which will not cut into the fruit and which acts therefore as a gauging surface to determine the maximum diameter of the planes cut on the said lowermost ends of the fruit, and means for moving said trimming mechanism relatively to said cups to bring said cutter into engagement with said fruit.

6. In a fruit processing system wherein the fruit is axially cored and is transported by fruit holding cups having open bottom portions, said cups individually supporting said fruit with the longitudinal axes of the fruit being vertically oriented, the improvement comprising a mechanism for trimming the lowermost ends of said fruit into planar form by movement into and out of said open bottom portions of the cups, said mechanism comprising a support sleeve, a cutting element comprising a plurality of cutting edges, an imperforate gauging means, and a guide portion, said edges defining a cutting plane, said gauging means being disposed about the periphery of said edges and said guide portion projecting from said plane, and means for moving said trimming mechanism relatively to said cups to bring said cutting plane into engagement with the said lowermost end of said fruit.

7. A fruit trimming mechanism as set forth in claim 1 wherein said cutting member comprises a plate having a flat upper surface and a plurality of spaced cylindrical passages extending therethrough with the axes of said passages extending perpendicularly to said surface and parallel to each other.

8. A fruit trimming mechanism as set forth in claim 7 wherein said upper surface of the plate is relieved adjacent each of said passages.

9. A fruit trimming mechanism as set forth in claim 1 wherein said cutting member includes a hub having an axis about which the member is adapted to rotate, said imperforate surface being defined by the uppermost flat surface of an annulus, and said cutting plane being defined by the uppermost sharp edges of a plurality of fins connecting said annulus with said hub.

10. A fruit trimming mechanism as set forth in claim 1 wherein the cutting plane of said member is defined by a plate having a serrated upper surface.

11. A fruit trimming mechanism comprising a rotatable cutting member adapted to be continuously rotated while in abutment with one of the ends of the fruit to trim said end into a predetermined end shape, said member including a plurality of cutting edges defining a cutting plane for producing said predetermined end shape, said cutting edges being bounded by an imperforate integral band providing an annular surface portion coplanar with said cutting edges which surface acts as a gauge to prevent the cutting edges from moving into the fruit beyond a predetermined distance to thereby determine the maximum diameter of the trimmed end of the fruit.

12. A fruit trimming mechanism comprising a rotatable cutting member adapted to be continuously rotated while in abutment with one of the ends of the fruit to trim said end into a planar form, said member including a plurality of cutting edges defining a flat cutting plane, said cutting edges being surrounded by an imperforate surface acting as a gauge to prevent the cutting edges from moving into the fruit beyond a predetermined distance and to thereby determine the maximum diameter of the trimmed end of the fruit, said cutting member comprising a plate having a flat upper surface and a plurality of spaced cylindrical passages extending therethrough with the axes of said passages extending at an acute angle with said surface.

References Cited by the Examiner
UNITED STATES PATENTS

| | | | |
|---|---|---|---|
| 2,552,933 | 5/1951 | Browne | 146—124 X |
| 2,622,639 | 12/1952 | Meyers | 144—2 X |
| 2,688,993 | 9/1954 | White | 146—81 X |
| 3,096,800 | 7/1963 | Creed et al. | 146—81 X |
| 3,113,603 | 12/1963 | Gardiner | 146—43 |

WILLIE G. ABERCROMBIE, *Examiner.*

ROBERT C. RIORDON, *Primary Examiner.*